(12) United States Patent
Choi

(10) Patent No.: US 8,807,307 B2
(45) Date of Patent: Aug. 19, 2014

(54) HIGH-PERFORMANCE SHEAR FRICTION DAMPER

(75) Inventor: Jae Hyouk Choi, Gwangju (KR)

(73) Assignee: Industry-Academic Cooperation Foundation, Chosun University, Gwangju (KR)

( * ) Notice: Subject to any disclaimer, the term of this patent is extended or adjusted under 35 U.S.C. 154(b) by 205 days.

(21) Appl. No.: 13/389,786

(22) PCT Filed: Feb. 11, 2011

(86) PCT No.: PCT/KR2011/000949
§ 371 (c)(1),
(2), (4) Date: Feb. 9, 2012

(87) PCT Pub. No.: WO2011/099816
PCT Pub. Date: Aug. 18, 2011

(65) Prior Publication Data
US 2012/0138402 A1    Jun. 7, 2012

(30) Foreign Application Priority Data

Feb. 12, 2010  (KR) .................. 10-2010-0013474
Feb. 12, 2010  (KR) .................. 10-2010-0013475

(51) Int. Cl.
*F16F 9/344*    (2006.01)
*E04H 9/02*    (2006.01)

(52) U.S. Cl.
CPC . *E04H 9/02* (2013.01); *E04H 9/028* (2013.01)
USPC ........... 188/381; 188/105; 248/562; 248/636; 52/167.1

(58) Field of Classification Search
CPC ............... E04H 9/02; E04H 9/028; F16F 7/08
See application file for complete search history.

(56) References Cited

U.S. PATENT DOCUMENTS

| 3,690,413 | A | * | 9/1972 | Airheart | 188/381 |
| 3,697,108 | A | * | 10/1972 | Diener | 293/133 |
| 3,747,969 | A | * | 7/1973 | Diener | 293/133 |
| 4,929,008 | A | * | 5/1990 | Esfandiary | 293/108 |
| 7,182,187 | B2 | * | 2/2007 | Mochimaru et al. | 188/297 |
| 8,002,093 | B2 | * | 8/2011 | Mochimaru et al. | 188/297 |

FOREIGN PATENT DOCUMENTS

| JP | 2001-336560 A | 12/2001 |
| JP | 2001-342749 A | 12/2001 |
| JP | 2008-138833 A | 6/2008 |
| JP | 2009-191585 A | 8/2009 |

(Continued)

*Primary Examiner* — Thomas Irvin
(74) *Attorney, Agent, or Firm* — Mitchell P. Brook; McKenna Long & Aldridge LLP

(57) ABSTRACT

Disclosed is a high-performance shear friction damper provided in a building construction and attenuating a vibration which is applied to the building construction due to external loads such as an earthquake or strong wind. The high-performance shear friction damper includes first and second support bodies supported to a building construction or damping rods, two prop plates fixed to the second support body and extending to surround both side surfaces of the first support body, friction plates mounted between the first support body and the prop plates, and fastening units each including a tension bolt penetrating the first support body, the friction plates and the prop plates, and a nut fastened to an end of the tension bolt, wherein the first support body has slots extending in a horizontal direction, the tension bolts extend while penetrating the slots to allow the first support body to be slidably movable in the horizontal direction with respect to the friction plates.

1 Claim, 14 Drawing Sheets

(56) References Cited

FOREIGN PATENT DOCUMENTS

| WO | WO 9725550 | A2 | * | 7/1997 | | |
| WO | WO 2009001807 | A1 | * | 12/2008 | ............... | F16F 7/08 |
| WO | WO 2009075175 | A1 | * | 6/2009 | ............... | E04H 9/02 |
| WO | WO 2011158823 | A1 | * | 12/2011 | | |

* cited by examiner

HIGH-PERFORMANCE SHEAR FRICTION DAMPER

TECHNICAL FIELD

The present invention relates to a high-performance shear friction damper, and more particularly, to a high-performance shear friction damper provided in a building construction and attenuating a vibration which is applied to the building construction due to external loads such as an earthquake or strong wind, and capable of effectively coping with external forces having various magnitudes.

BACKGROUND ART

When members of a building construction are subjected to horizontal external forces, the members are twisted or horizontally moved. In particular, the twisting generated in a building construction or a tower may cause severe shocks or collapse of the building construction or the tower.

A damper plays an important role in protecting a building construction, for example, a house or the like, and exists in numerous modified forms.

The damper attenuates movement by a frictional force between two movable parts fixed between members of a construction structure or a fluid moving between two chambers through a limited tube.

Some dampers are active dampers that actively change an attenuation effect corresponding to an external state and others are passive dampers that have predetermined attenuating characteristics.

However, the conventional dampers are costly and much higher costs are required in assembling the dampers with members of a building construction.

In addition, when friction plates mounted to offer a frictional force are abraded, the friction plates capable of attenuating a vibration may be functionally degraded and the entire damper structure is necessarily replaced, thereby resulting in increased maintenance and replacement costs In addition, since the conventional damper, particularly, the friction damper, is designed to absorb vibration energy while moving with a constant frictional force, it cannot effectively cope with external forces (loads) of various magnitudes.

That is to say, in a case of a friction damper having great friction durability, since the friction damper is not driven by a small external load such as a small scale earthquake or a vibration due to a wind, it may not function as a damper.

Conversely, in a case of a friction damper having small friction durability, since the friction damper is not driven by a large external load such as a large scale earthquake, it may not properly attenuate vibration energy.

DISCLOSURE OF THE INVENTION

In order to overcome the above-mentioned shortcomings, the present invention provides a high performance shear friction damper, which can be easily installed to attenuate a vibration of a construction and can separately replace only friction plates to reduce maintenance and repair costs.

The present invention also provides a high performance shear friction damper, which has a plurality of friction behavior sections having different friction durability levels so as to effectively cope with external loads of various magnitudes.

According to an aspect of the invention, there is provided a high performance shear friction damper including first and second support bodies supported to a building construction or damping rods, two prop plates fixed to the second support body and extending to surround both side surfaces of the first support body, friction plates mounted between the first support body and the prop plates, and fastening units each including a tension bolt penetrating the first support body, the friction plates and the prop plates, and a nut fastened to an end of the tension bolt, wherein the first support body has slots extending in a horizontal direction, the tension bolts extend while penetrating the slots to allow the first support body to be slidably movable in the horizontal direction with respect to the friction plates.

The first support body may include a first end plate supported to the building construction or the damping rods, and a sliding plate extending from a bottom surface center of the first end plate in a direction perpendicular to the first end plate, the second support body includes a second end plate facing the first end plate and supported to the building construction or the damping rods, and extending part extending from the center of the second end plate toward an end of the sliding plate in a direction perpendicular to the second end plate, the extending part has coupling protrusions protruding in opposite sides, and the prop plates have coupling holes into which the coupling protrusions are inserted.

Each of the fastening units may further include a plated spring washer provided to prevent fastening forces of the tension bolts from being lowered due to a reduction in thicknesses of the friction plates.

According to another aspect of the invention, there is provided a high-performance shear friction damper including a first support body supported to a building construction or damping rods, a second support body slidably connected to an upper portion of the first support body, prop plates unit including first prop plates mounted on front and rear surfaces of the first support body, second prop plates connected to the first prop plates and mounted on front and rear surfaces of the second support body, and a connection part connecting the first and second prop plates to allow the first and second prop plates to independently move back and forth while integrally moving in a direction in which the second support body slidably moves, a first friction plate installed between the first support body and the first prop plate, a second friction plate installed between the second support body and the second prop plate, and fastening units each including a first fastening unit fastening the first prop plate and the first friction plate to the first support body to have a predetermined friction durability, and a second fastening unit fastening the second prop plate and the second friction plate to the second support body to have a friction durability different from that of the first fastening unit.

The first support body may include a first end plate supported to the building construction or the damping rods, and a first sliding plate extending from a center of the first end plate in a direction perpendicular to the first end plate and having first sliding holes penetrating front and rear surfaces of the first end plate, the second support body includes a second end plate facing the first end plate and supported to the building construction or the damping rods and a second sliding plate extending from a center of the second end plate to an end of the first sliding plate in a direction perpendicular to the second end plate and having second sliding holes penetrating front and rear surfaces of the second end plate.

The first and second prop plates and the first and second friction plates may have first and second bolting holes and first and second penetrating holes located to correspond to each other so as to be coupled to each other by the fastening units, respectively, and the first and second fastening units may include tension bolts extending while penetrating the first bolting holes, the first penetrating hole and the first sliding hole, and the second bolting holes, the second penetrating hole and the second sliding hole, respectively, nuts fastened with ends of the tension bolts, and washer members mounted on the tension bolts for preventing friction durability based on the first and second fastening units when the first and second friction plates are abraded.

The connection part may be formed on the first prop plate and may include a first coupling part having coupling protrusions protruding to extend back and forth while penetrating front and rear surfaces of the first and second support bodies, and a second coupling part having coupling holes formed in the second prop plate to allow the coupling protrusions to be inserted thereto and shaped to correspond to the coupling protrusions while penetrating back and forth.

According to still another aspect of the invention, there is provided a high-performance shear friction damper including an end plate fixed to a building construction, a sliding panel unit including a main sliding plate extending to a lower portion of the end plate, auxiliary sliding plates connected to a lower portion of the extending part so as to slip left and right with the extending part, and a hooking part connecting the main sliding plate and the auxiliary sliding plates so as to have a predetermined gap left and right, prop plates mounted on front and rear surfaces of the sliding panel unit, first and second auxiliary end plates installed at both left and right ends of the prop plates and supported to damping rods, a plurality of friction plates installed between each of the prop plates and the main sliding plate and the auxiliary sliding plates, and fastening units fastening the sliding panel unit, the friction plates and the prop plates, wherein when the main sliding plate and the auxiliary sliding plates are fastened to the friction plates, friction durability levels are different from each other.

The sliding panel unit may include a first auxiliary sliding plate connected to a lower portion of the main sliding plate so as to slip left and right, and a second auxiliary sliding plate connected to the first auxiliary sliding plate so as to slip left and right, the main sliding plate and the first and second auxiliary sliding plates have first to third slots formed to penetrate front and rear surfaces thereof, respectively, wherein the first slot is longest and the third slot is shortest, and the hooking part has hooking protrusions upwardly protruding a predetermined length from top ends of the first and second auxiliary sliding plates and inserted into hooking grooves formed at lower ends of the main sliding plate and the first auxiliary sliding plate.

Advantageous Effects

As described above, since the high performance shear friction damper can be easily installed to attenuate a vibration of a construction, and only friction plates can be separately replaced to facilitate maintenance and repair operations. Further, it is possible to effectively cope with external loads of various magnitudes.

BRIEF DESCRIPTION OF THE DRAWINGS

The objects, features and advantages of the present invention will be more apparent from the following detailed description in conjunction with the accompanying drawings, in which.

BEST MODE FOR CARRYING OUT THE INVENTION

Hereinafter, a high performance shear friction damper according to the present invention will be described in more detail.

Figure 1:
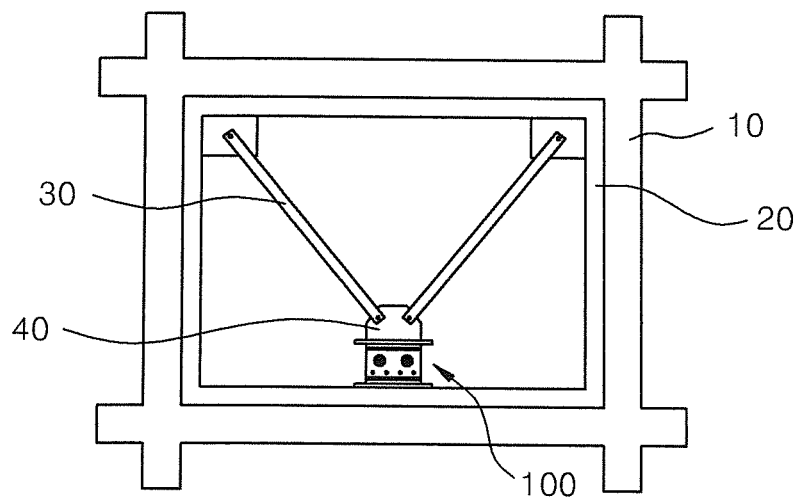
FIG. 1 is a front view illustrating an example of an installed state of a high performance shear friction damper.

FIG. 1 is a front view illustrating an example of a state in which a high performance shear friction damper 100 is installed in a building construction 10.

As shown in FIG. 1, an iron frame 20 is installed in the building construction 10, and the high performance shear friction damper 100 according to the present invention is mounted at the bottom center of the iron frame 20. In addition, the high performance shear friction damper 100 is supported by damping rods 30 supported to both upper ends of the iron frame 20.

If a vibration is applied to the building construction 10 due to external forces such as an earthquake or strong wind, the high performance shear friction damper 100 having bottom and top ends coupled to the frame 20 and the damping rods 30 attenuates the vibration while sliding in a horizontal direction, and the vibration energy applied to the building construction 10 is diverged due to a frictional heat generated in the friction plates 140, thereby minimizing damages caused to the building construction 10.

Figure 2:
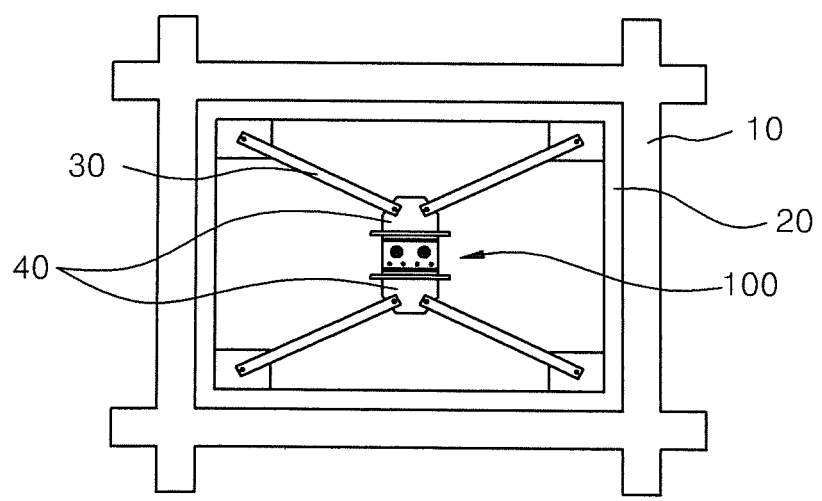
FIGS. 2 to 5 are front views illustrating other examples of an installed state of a high performance shear friction damper.

FIG. 2 illustrates another example of an installed state of a high performance shear friction damper.

As shown in FIG. 2, top and bottom portions of the high performance shear friction damper 100 may be supported by four damping rods 30 supported to four corners of a frame.

Figure 3:
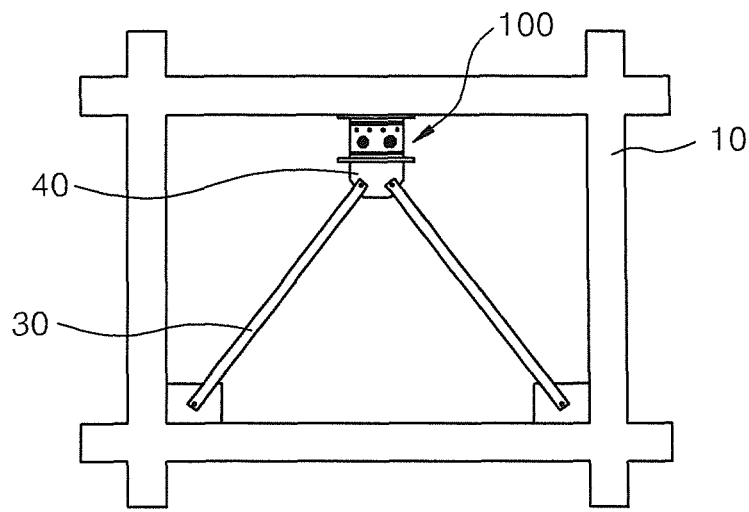
Figure 4:
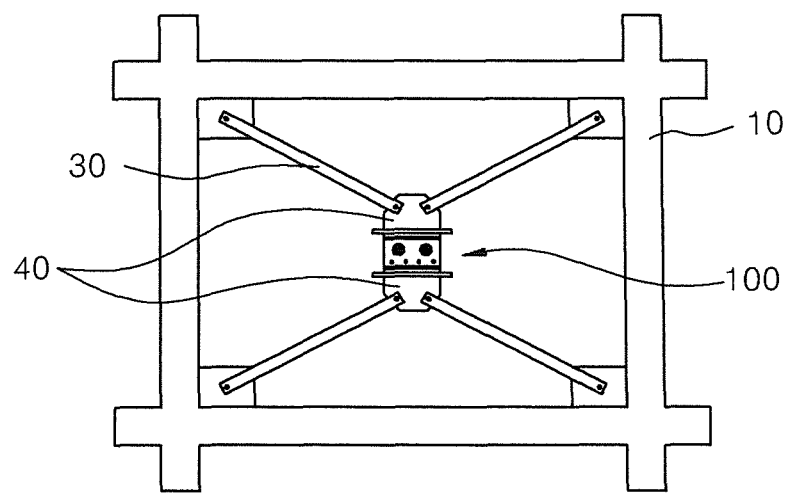
Figure 5:
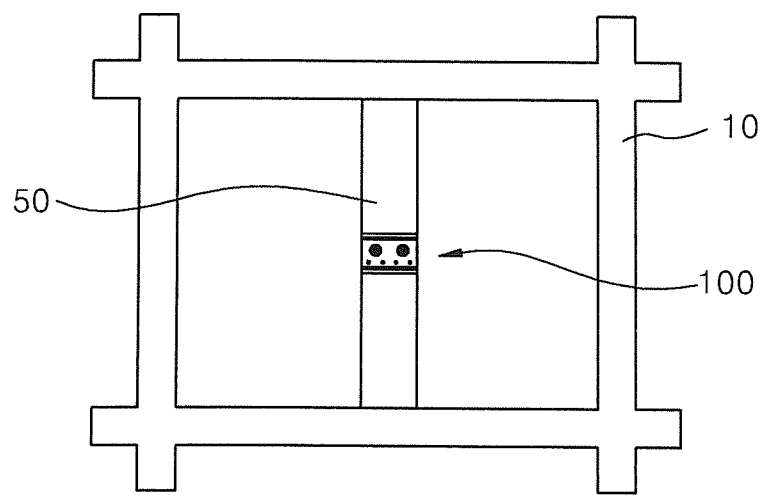

In addition, as shown in FIGS. 3 and 4, the high performance shear friction damper 100 and the damping rods 30 may be directly supported to the building construction 10 without use of an iron frame 20. As shown in FIG. 5, a vertical auxiliary post 50 is installed in the building construction 10, and the high performance shear friction damper 100 may be installed at the center of the auxiliary post 50.

The basic principle of the high performance shear friction damper 100 according to the present invention is that the high performance shear friction damper 100 can be installed in various manners and minimizes external forces applied to the building construction 10 by converting vibration energy into frictional heat with respect to the vibration applied in a horizontal direction.

Figure 6:
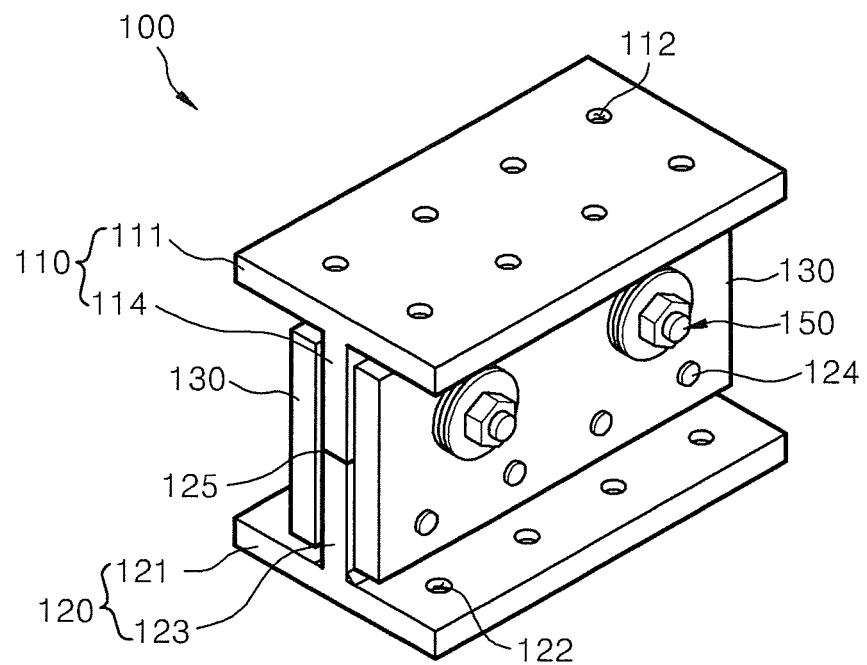
FIG. 6 is a perspective view of a high performance shear friction damper according to a first embodiment of the present invention.
Figure 7:
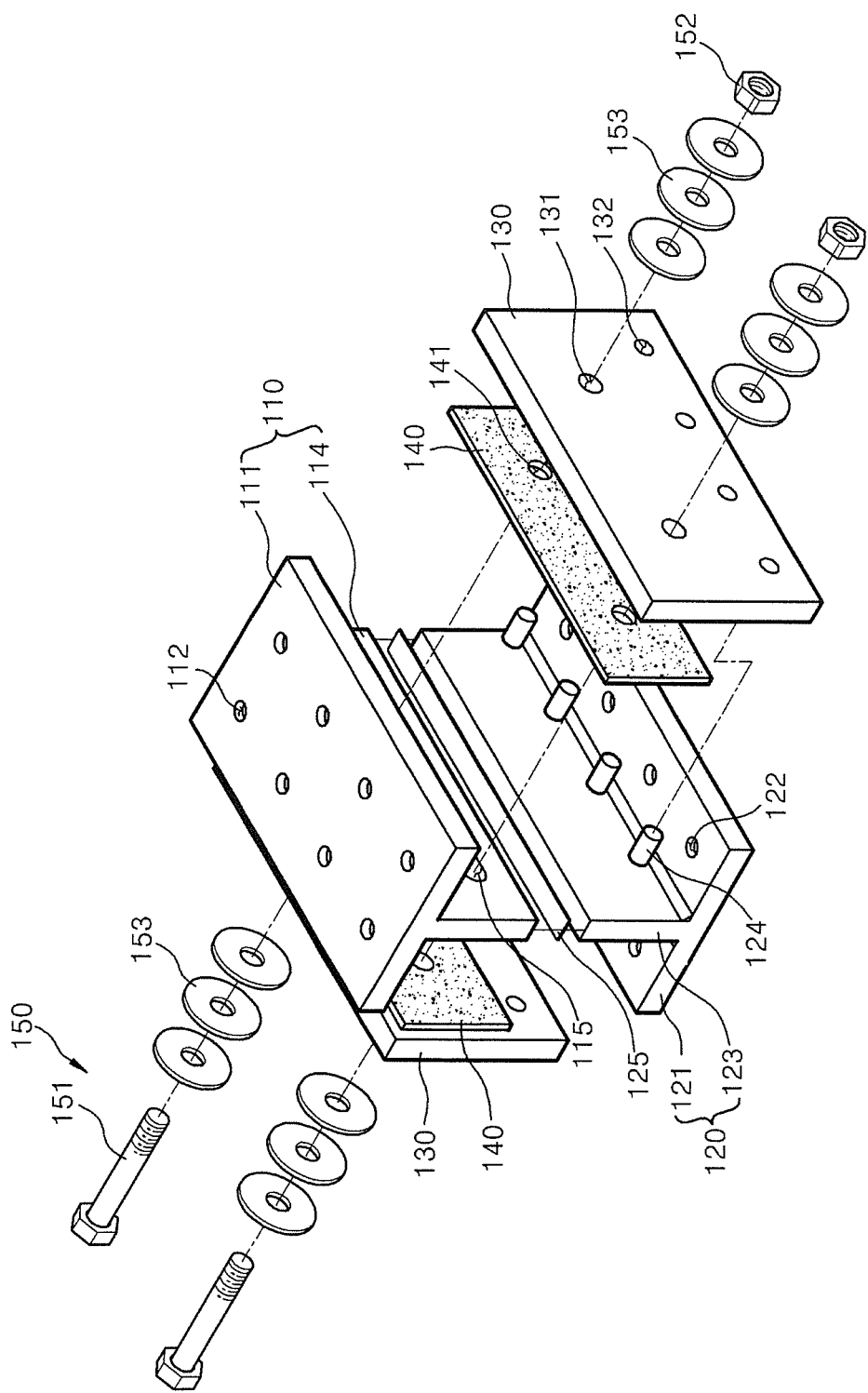
FIG. 7 is an exploded perspective view of the high performance shear friction damper shown in FIG. 6.
Figure 8:
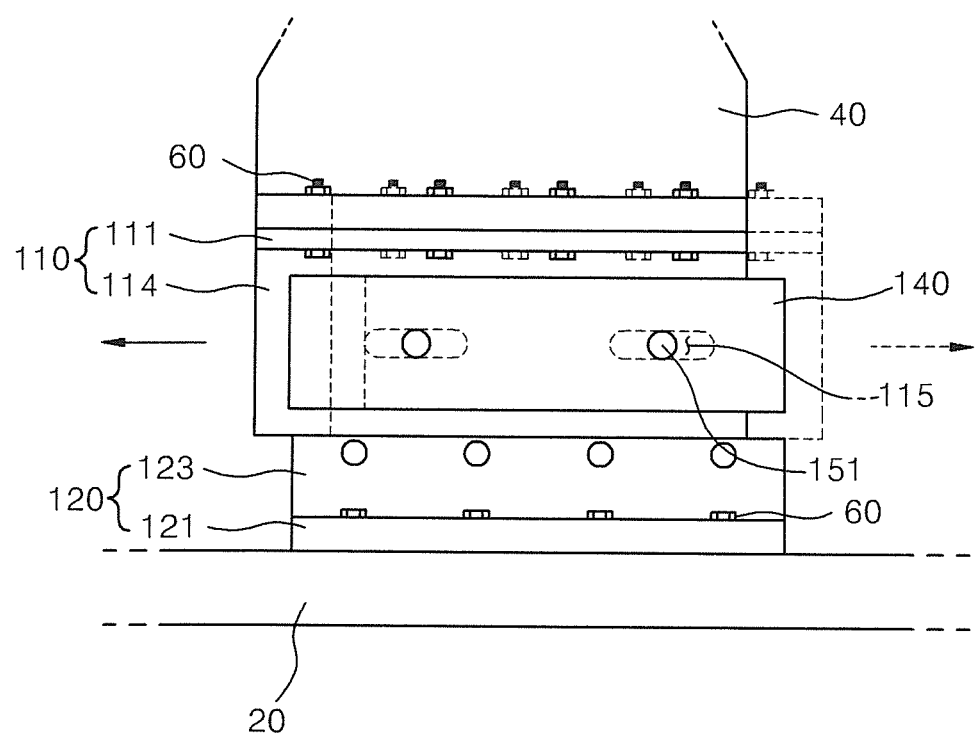
FIG. 8 is a cross-sectional view illustrating an operation state of the high performance shear friction damper shown in FIG. 6.

FIGS. 6 to 8 illustrate a high performance shear friction damper according to a first embodiment of the present invention.

Referring to FIGS. 6 to 8, the high performance shear friction damper 100 includes first and second support bodies 110 and 120, prop plates 130 connecting first and second support bodies 110 and 120, friction plates 140 installed between the first support body 110 and the prop plates 130, and fastening units 150 for coupling the prop plates 130 to the friction plates 140.

Referring back to FIG. 1, the first support body 110 includes a first end plate 111 fixed to a rod fastening member 40 connecting ends of the damping rods 30, and a sliding plate 114 downwardly extending from the first end plate 111.

A plurality of fastening holes 112 penetrating top and bottom surfaces of the first end plate 111 are formed in the first end plate 111, and achieve fastening using fastening members 60.

The sliding plate 114 downwardly extends a predetermined length from the bottom surface of the first end plate 111, and is formed in a 'T' shape when viewed laterally. Two slots 115 are formed in the sliding plate 114 to be spaced apart from each other, the two slots 115 extending a predetermined length in a horizontal direction while penetrating front and rear surfaces of the sliding plate 114.

The second support body 120 includes a second end plate 121 fixed to the iron frame 20, and an extending part 123 upwardly extending from the top surface of the second end plate 121. A plurality of fastening holes 122 are formed in the second end plate 121 to allow the fastening members 60 to be mounted thereon. The extending part 123 upwardly extends from the center of the top surface of the second end plate 121 in a reverse 'T' shape.

Therefore, in the first and second support bodies 110 and 120, the first and second end plates 111 and 121 are supported to the rod fastening member 40 connected to the building construction 10 or the damping rods 30, the sliding plate 114 and the extending part 123 extend to face each other. In addition, coupling protrusions 124 protrude on front and rear surfaces of the extending part 123.

The first and second support bodies 110 and 120 are connected to each other by prop plates 130 to be described later, and a sheet 125 made of Teflon having a small friction coefficient is coated between a bottom end of the sliding plate 114 and a top end of the extending part 123 to facilitate slidable movement of the first support body 110.

The prop plates 130 are fixed to the second support body 120 and fix the first support body 110 to the second support body 120 through the fastening units 150.

Coupling holes 132 shaped to correspond to the coupling protrusions 124 are formed at lower portions of the prop plates 130 to allow the coupling protrusions 124 to be inserted thereto.

First bolting holes 131 are formed above the coupling holes 132 to allow the tension bolts 151 of the fastening units 150 to penetrate.

While the coupling protrusions 124 are shaped of a cylinder having a predetermined diameter in the current embodiment, they may be shaped of a prism or a cylindroid extending in a lengthwise direction as long as the prop plates 130 can be connected to the extending part 123.

The friction plates 140 are provided for attenuating an external force applied to the building construction 10 by offering a frictional force when the first support body 110 slidably moves in a horizontal direction with respect to the second support body 120 by the external force.

The friction plates 140 are positioned between front and rear surfaces of the sliding plate 114 and the prop plates 130. Since the second bolting holes 141 are formed corresponding to the first bolting holes 131, the friction plates 140 are fixed between the sliding plate 114 and the prop plates 130 by the fastening units 150.

When the sliding plate 114 horizontally moves due to a vibration so as to attenuate the external force, the friction plates 140 come into contact with the sliding plate 114 to generate frictional heat, thereby allowing the externally applied vibration energy to be consumed as heat energy. The sliding plate 114 is preferably formed of a material having a smaller hardness than the sliding plate 114.

Since the friction plates 140 are formed of a material having a smaller hardness than the sliding plate 114, abrasion of the friction plates 140 may be generated when the friction plates 140 and the sliding plate 114 are in continuous contact by friction, so that the thicknesses of the friction plates 140 gradually decrease. However, the sliding plate 114 may not be deformed and can be used for a long time.

The replaceable friction plates 140 are formed of an easily abradable material. Thus, vibration attenuating capability of the high performance shear friction damper 100 can be maintained at a proper level by replacing the friction plates 140.

In the current embodiment, contact surfaces of the sliding plate 114 and the friction plates 140 are all planar. However, in order to increase a frictional area, the contact surfaces of the sliding plate 114 and the friction plates 140 may be formed to have irregularities so as to allow the sliding plate 114 and the friction plates 140 to be engaged to each other.

The fastening units 150 are provided for fastening the sliding plate 114, the friction plates 140 and the prop plates 130, and each of the fastening units 150 includes a tension bolt 151, a nut 152 and a washer member 153.

After the washer members 153 are inserted into the tension bolts 151 so as to penetrate sequentially one prop plate 130, one friction plate 140, the sliding plate 114, the other friction plate 140 and the other prop plate 130, they are inserted into the other sides of the tension bolts 151 to then be fastened by the nuts 152.

The high performance shear friction damper 100 may have vibrations of various magnitudes according to the friction durability between the friction plates 140 and the sliding plate 114. That is to say, since a strong vibration has a large vibration magnitude, the friction plates 140 and the sliding plate 114 should be fastened to each other so as to provide large friction durability, thereby effectively attenuating the vibration.

Conversely, since a weak vibration has a small vibration magnitude, friction durability should be small, thereby effectively attenuating vibration energy by a slip generated between the friction plates 140 and the sliding plate 114.

Therefore, in consideration of the purposes, location installed, or other conditions, friction durability may be appropriately set and the tension bolts 151 may be tightened using a torque wrench, thereby providing the set friction durability between the friction plates 140 and the sliding plate 114.

The washer members 153 may be plated spring washers. Here, if a slip is continuously generated between the friction plates 140 and the sliding plate 114 due to a vibration, the friction plates 140 are finally abraded, resulting in a reduction of thicknesses of the friction plates 140. Accordingly, as a fastening force of the tension bolts 151 is lowered due to the reduction in the thicknesses of the friction plates 140, the friction durability between the friction plates 140 and the sliding plate 114 may not be maintained at the level that was initially set.

If the friction durability is lowered, the high performance shear friction damper 100 may functionally deteriorate. Thus, even if the friction plates 140 are abraded through the washer members 153, the plated spring washers are preferably used as the washer members 153 so as to maintain the friction durability between the friction plates 140 and the sliding plate 114.

The high performance shear friction damper 100 according to the embodiment of the present invention operates as follows.

In the high performance shear friction damper 100, the second support body 120 is fixed to the iron frame 20 installed in the building construction 10 or to the building construction 10, and the first support body 110 is supported to the rod fastening member 40 connected to the damping rods 30.

Figure 9:
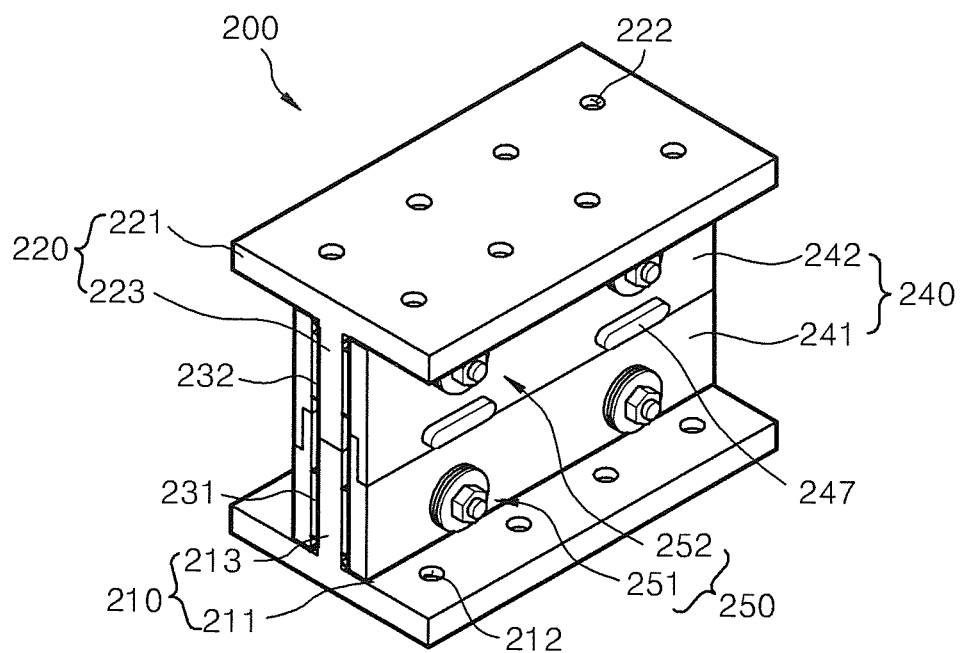
FIG. 9 is a perspective view of a high performance shear friction damper according to a second embodiment of the present invention.
Figure 10:
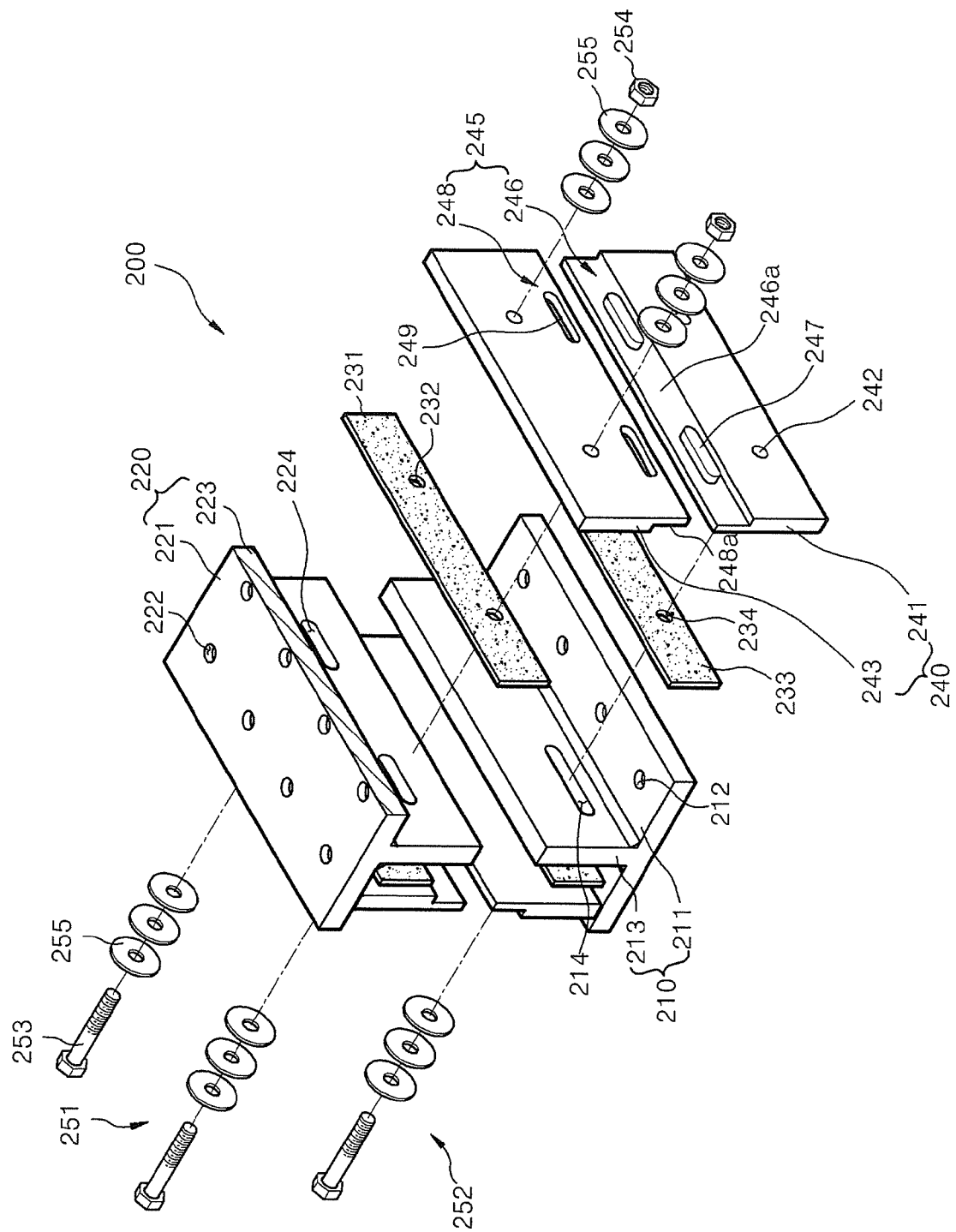
FIG. 10 is an exploded perspective view of the high performance shear friction damper shown in FIG. 9.

If an external force such as an earthquake is applied to the building construction 10, the iron frame 20 may be stressed in a horizontal direction. During this procedure, as shown in FIG. 9, the sliding plate 114 of the first support body 110 may slip left and right with respect to the friction plates 140, the prop plates 130 and the second support body 120.

Since the sliding plate 114 is in contact with the friction plates 140 with a predetermined level of friction durability, the vibration energy is consumed as the frictional heat due to the slip, thereby attenuating the vibration energy transferred to the building construction 10.

If the friction plates 140 are abraded by a predetermined level or less due to a constantly applied vibration, the tension bolts 151 and the nuts 152 are separated from each other, and the prop plates 130 are then separated from the second support body 120, followed by replacing the abraded friction plates 140 with new friction plates 140.

In such a manner, since the friction plates 140 can be easily replaced when their cycle life ends, unlike in the conventional method in which the high performance shear friction damper 100 is entirely replaced, maintenance and repair of the high performance shear friction damper 100 can be easily performed and the manufacturing cost thereof can be reduced.

FIGS. 9 to 13 illustrate a high performance shear friction damper 200 according to a second embodiment of the present invention.

The high performance shear friction damper 200 will be described with regard to an installed state shown in FIG. 1 with reference to FIGS. 9 to 13. The high performance shear friction damper 200 according to the second embodiment of the present invention includes first and second support bodies 210 and 220 supported to a rod fastening member 40 fastening a building construction 10 and damping rods 30, prop plates unit 240 coupled to front and rear surfaces of the first and second support bodies 210 and 220, first and second friction plates 231 and 233 inserted between the prop plate unit 240 and the first and second support bodies 210 and 220, and fastening units 250 fastening the first and second support bodies 210 and 220, the first and second friction plates 231 and 233 and the prop plate unit 240 to provide a predetermined level of friction durability.

The first support body 210 includes a first end plate 211 fixed to the building construction 10 and a first sliding plate 213 upwardly extending from a top surface of the first end plate 211. The first end plate 211 has a plurality of fastening holes 212 formed to penetrate top and bottom surfaces of the first end plate 211 so as to be fixed to the building construction 10 through fastening bolts.

The second support body 220 is installed above the first support body 210 and includes a second end plate 221 connected to the rod fastening member 40 and a second sliding plate 223 downwardly extending from a center of the second end plate 221. The second end plate 221 also has second sliding holes 222 penetrating front and rear surfaces of the second end plate 221 to allow fastening bolts to penetrate through the fastening holes 222, thereby coupling the second end plate 221 to the rod fastening member 40.

The first and second sliding plates 213 and 223 have first and second sliding holes 214 and 224 penetrating front and rear surfaces thereof, respectively. Since the first and second sliding holes 214 and 224 are provided for allowing tension bolts 253, which will later be described, to penetrate the same, have widths correspond to outer diameters of the tension bolts 253, and extend a predetermined length left and right. In particular, the first sliding hole 214 is longer than the second sliding hole 224.

The prop plate unit 240 is mounted on front and rear surfaces of the first and second sliding plates 213 and 223 and includes first and second prop plates 241 and 243 and a connection part 245 connecting the first and second prop plates 241 and 243 to each other.

As described above, the first prop plates 241 are installed on the front and rear surfaces of the first sliding plate 213, respectively, and first bolting holes 242 having diameters corresponding to outer diameters of the tension bolts 253 formed to penetrate back and forth so as to allow the tension bolts 253 to penetrate.

The second prop plates 243 are installed on the front and rear surfaces of the second sliding plate 223, respectively, and second bolting holes 244 having diameters corresponding to outer diameters of the tension bolts 253 formed to penetrate back and forth so as to allow the tension bolts 253 to penetrate.

The connection part 245 connects the first and second prop plates 241 and 243 to each other, and includes a first coupling part 246 provided at an upper portion of each of the first prop plates 241, and a second coupling part 248 provided in each of the second prop plates 243 to be connected to the first coupling part 246.

Assuming that surfaces of the first and second prop plates 241 and 243, which face the first and second sliding plates 213 and 223, are referred to as inner surfaces, and opposite surfaces are referred to as outer surfaces, the first coupling part 246 has first insertion grooves 246a inwardly recessed from the outer surfaces, and coupling protrusions 247 outwardly protruding are formed in the first insertion grooves 246a.

The second coupling part 248 is provided at a lower portion of the second sliding plate 223 and has second insertion grooves 248a inwardly recessed from the inner surfaces, and coupling holes 249 corresponding to the coupling protrusions 247 are formed in the second insertion groove 248a first insertion grooves 246a.

Therefore, the first and second coupling parts 246 and 248 are positioned such that the outer surface of the first coupling part 246 and the inner surface of the second coupling part 248 face each other, and the coupling protrusions 247 are inserted into coupling holes 249, thereby coupling the first and second prop plates 241 and 243 to each other through the first and second coupling parts 246 and 248.

Since the coupling protrusions 247 are inserted into the coupling holes 249, the first and second prop plates 241 and 243 integrally move left and right while independently moving back and forth in a direction in which the first and second prop plates 241 and 243 face the first and second sliding plates 213 and 223.

The first and second friction plates 231 and 233 are installed between each of the first prop plates 241 and the first sliding plate 213 and between each of the second prop plates 243 and the second sliding plate 223. The first and second friction plates 231 and 233 have first and second penetrating holes 232 and 234 for fastening the tension bolts 253, respectively.

In order to make the first and second friction plates 231 and 233 abraded due to frictional heat generated when slips are generated between the first and second friction plates 231 and 233 and the first and second sliding plates 213 and 223, the first and second friction plates 231 and 233 are preferably formed of materials having lower hardness than the first and second sliding plates 213 and 223. In addition, although not shown, in order to increase frictional areas, contact surfaces of the first and second friction plates 231 and 233 and the first and second sliding plates 213 and 223 may be formed to have irregularities.

Each of the fastening units 250 includes a first fastening unit 251 fastening the first sliding plate 213, the first friction plate 231 and the first prop plates 241, and a second fastening unit 252 fastening the second sliding plate 223, the second friction plate 233 and the second prop plates 243.

The first and second fastening units 251 and 252 include tension bolts 253, nuts 254, and washer members 255, respectively. If the first friction plate 231 and the first prop plate 241 are installed on front and rear surfaces of the first sliding plate 213, the tension bolt 253 of the first fastening unit 251 is installed to sequentially penetrate the first bolting hole 242, the first penetrating hole 232 and the first sliding hole 214, the washer members 255 are inserted into an end of the tension bolt 253 outwardly protruding from the first prop plate 241, and the nut 254 is threaded, thereby achieving fastening.

The second sliding plate 223, the second prop plate 243, and the second friction plate 233 are also fastened to each other in the same manner as described above.

If the first and second friction plates 231 and 233 are abraded due to frictional heat generated when slips are generated between the first and second friction plates 231 and 233 and the first and second sliding plates 213 and 223, the washer members 255 prevent friction durability from being lowered as fastening tension of the tension bolt 253 is reduced. Therefore, plated spring washers are preferably used as the washer members 255.

When the first fastening unit 251 and the second fastening unit 252 are fastened to each other, the tension bolt 253 may be tightened using a torque wrench. The tension bolts 253 and the nuts 254 are tightened to make friction durability between the first friction plate 231 and the first sliding plate 213 greater than friction durability between the second friction plate 233 and the second sliding plate 223.

The aforementioned high performance shear friction damper 200 according to the current embodiment of the present invention operates as follows.

Figure 11:
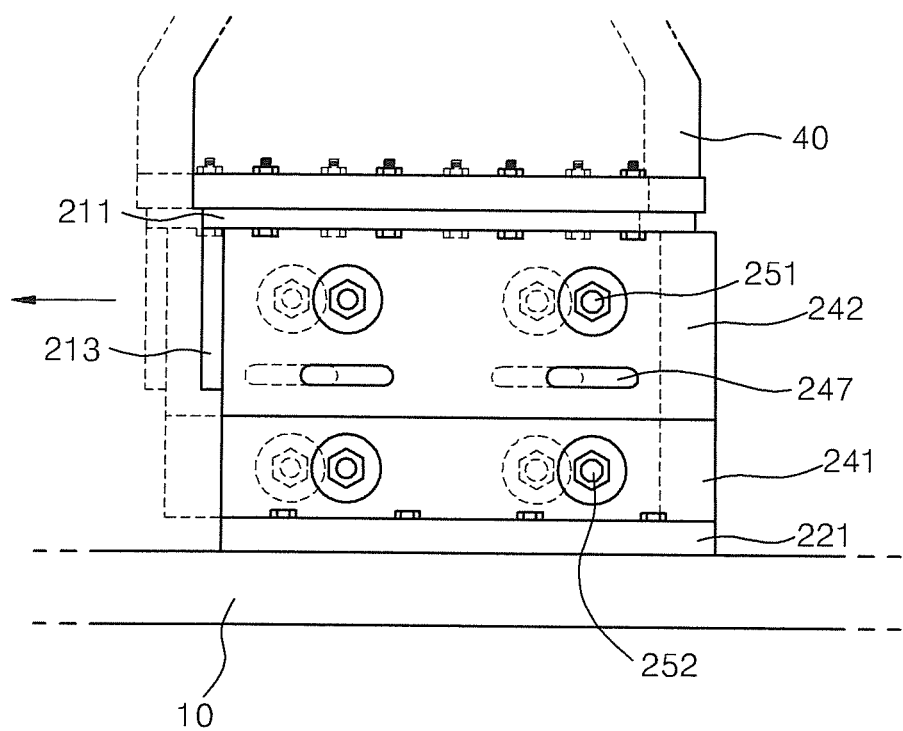
FIG. 11 is a front view illustrating an operation state of the high performance shear friction damper shown in FIG. 9.
Figure 12:
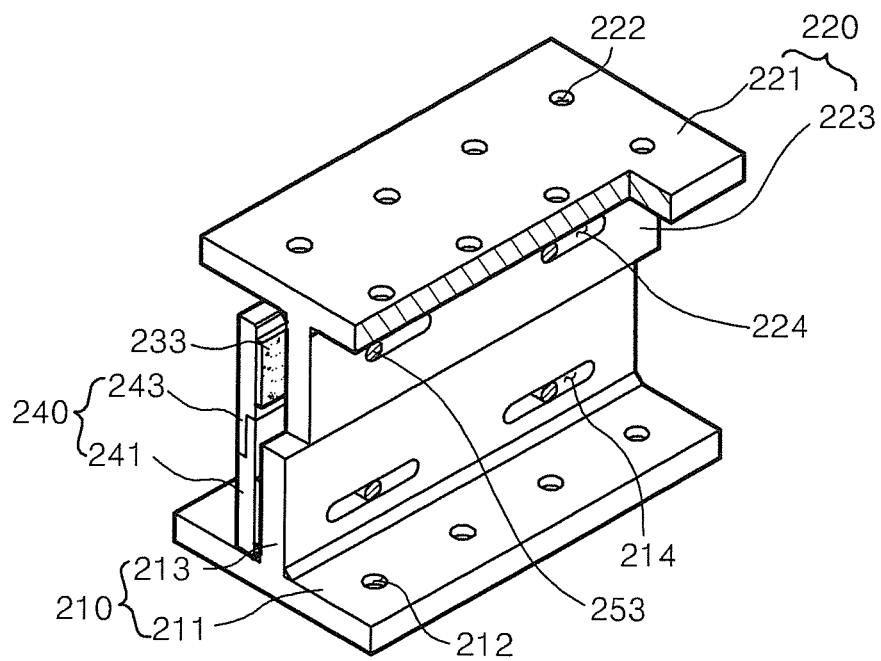
FIGS. 12 and 13 are partly exploded perspective views illustrating a driving state of a first support body when the high performance shear friction damper shown in FIG. 9 is driven.

First, in a case of a small vibration such as an external force due to a small scale earthquake or wind, as shown in FIGS. 11 and 12, since the tension bolt 253 of the second fastening unit 252 and the nut 254 are tightened with a relatively small fastening tension, the second support body 220 may slip left and right. Here, the energy is consumed as frictional heat due to friction between the second sliding plate 223 and the second friction plate 233.

In a case of a large scale earthquake, an externally applied force exceeds a level of friction durability between the second friction plate 233 and the second sliding plate 223.

Therefore, the second sliding plate 223 moves until the end of the second sliding hole 224 comes into contact with the tension bolt 253. Since the external force exceeds the friction durability between the first sliding plate 213 and the first friction plate 231, a slip may be generated between the first sliding plate 213 and the first friction plate 231. Since the first support body 210 is fixedly installed, the first friction plate 231 may slip left and right with respect to the first sliding plate 213.

Figure 13:
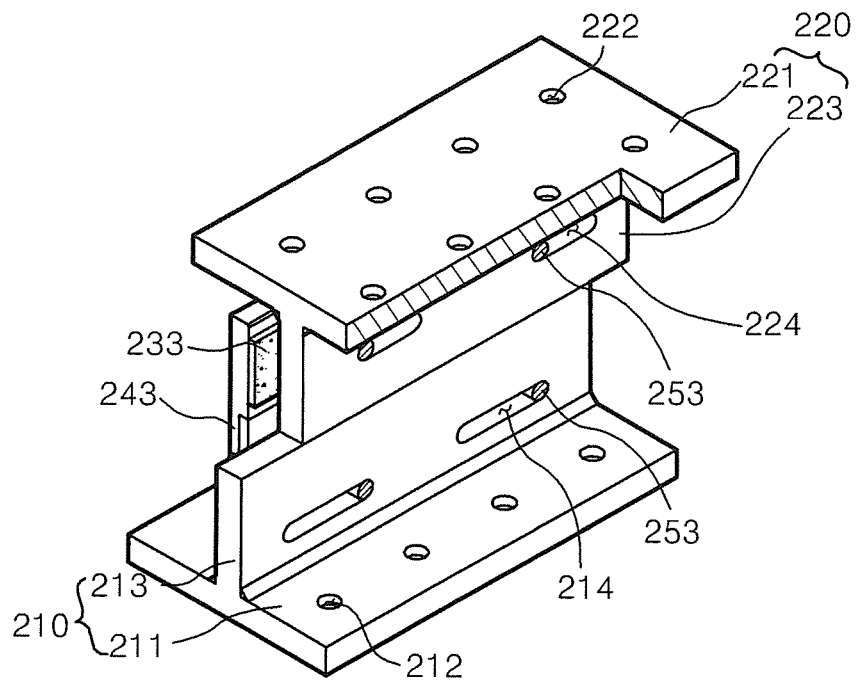

The first friction plate 231 moves integrally with the first prop plate 241 by the first fastening unit 251, and the first prop plate 241 moves integrally with second prop plate 243 left and right by the connection part 245. Consequently, the movement is achieved, as shown in FIGS. 11 and 13.

Since the first and second fastening units 251 and 252 are fastened with different fastening tensions, only the second support body 220 moves according to the intensity of external force applied to the building construction 10 to cause a friction only between the second friction plate 233 and the second sliding plate 223.

Alternatively, a slip may be generated such that frictions may be caused to the first and second friction plates 231 and 233, thereby effectively moving to attenuate a vibration with respect to external forces of various magnitudes. Although not shown, a Teflon sheet having a low friction coefficient is attached between each of the first and second sliding plates 213 and 223, thereby preventing the first and second prop plates 241 and 243 and the first and second end plates 211 and 221 from being abraded at contact portions.

FIGS. 14 to 19 illustrate a high performance shear friction damper 300 according to a third embodiment of the present invention.

Figure 14:
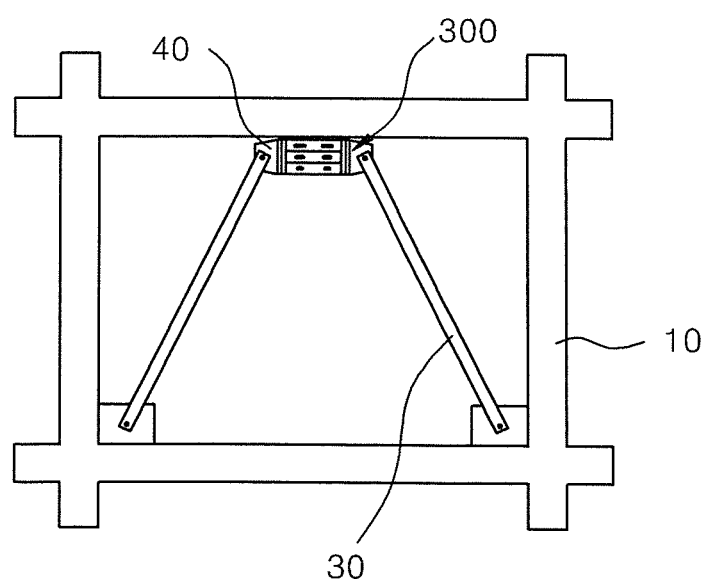
FIG. 14 is a front view illustrating an installed state of a high performance shear friction damper according to a third embodiment of the present invention.

As shown in FIG. 14, a top end of the high performance shear friction damper 300 according to the third embodiment of the present invention is fixed to a building construction 10 and damping rods 30 are connected to both left and right sides thereof. Alternatively, the top end of the high performance shear friction damper 300 may also be installed to face downward.

In a case where an iron frame 20 for installing the damper 300 is provided, the top end of the high performance shear friction damper 300 may be coupled to the iron frame 20.

Figure 15:
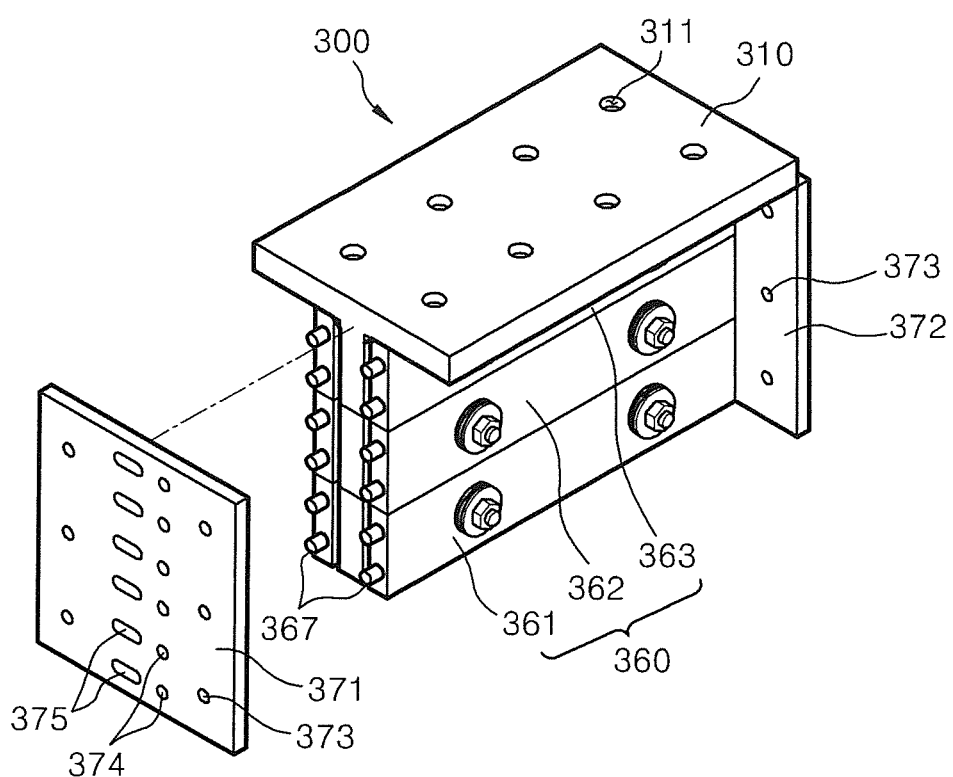
FIG. 15 is a perspective view of the high performance shear friction damper shown in FIG. 14.
Figure 16:
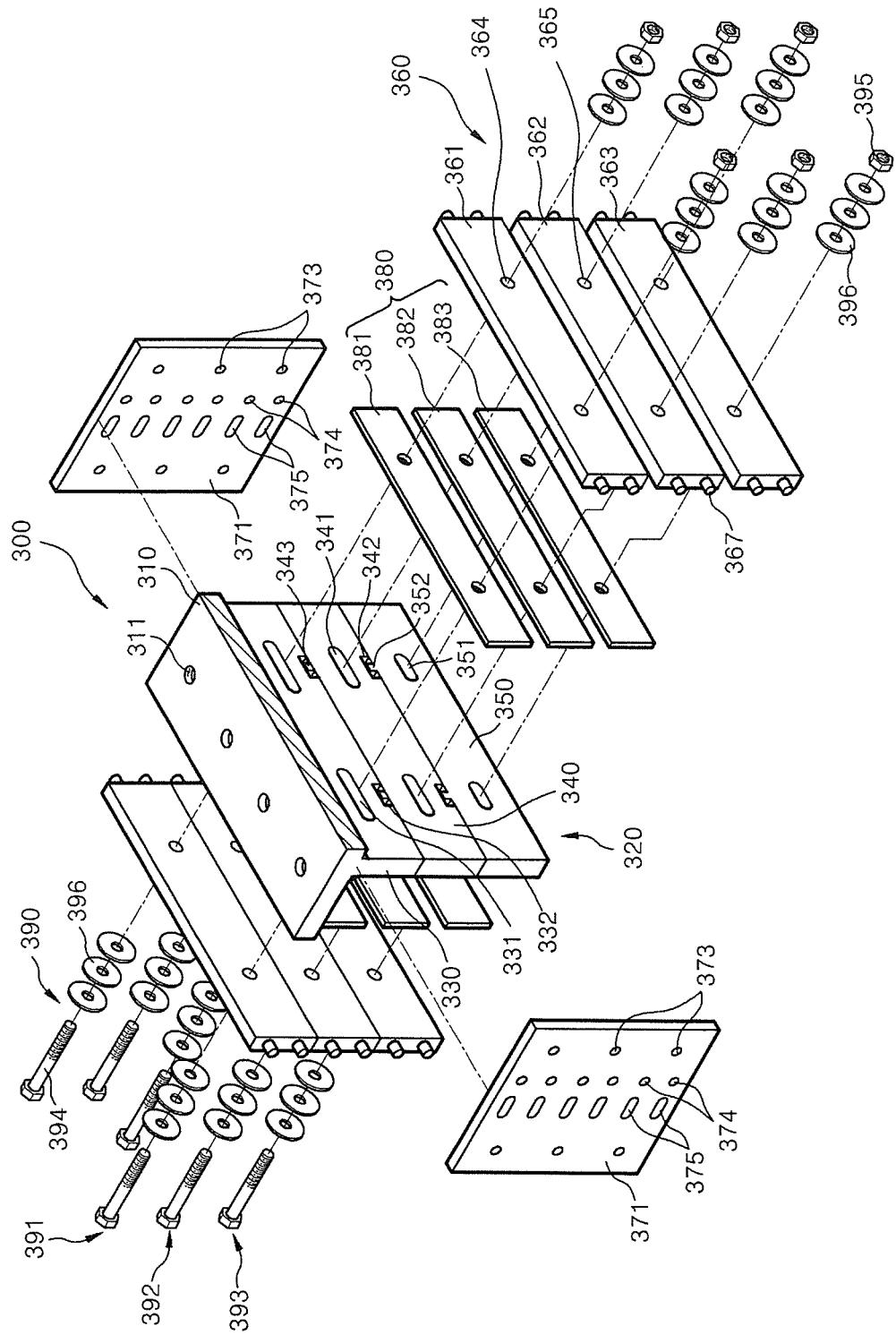
FIG. 16 is an exploded perspective view of the high performance shear friction damper shown in FIG. 14.

Referring to FIGS. 15 and 16, the high performance shear friction damper 300 includes an end plate 310 fixed to the building construction 10, a sliding panel unit 320 installed at a lower portion of the end plate 310, prop plates 360 installed on front and rear surfaces of the sliding panel unit 320, respectively, friction plates 380 installed between each of the prop plates 360 and the sliding panel unit 320, auxiliary end plates 310 installed at both left and right sides of the prop plates 360, and fastening units 390 fastening the sliding panel unit 320, the friction plates 380 and the prop plates 360.

As described above, the end plate 310 has a plurality of fastening holes 311 for installing fastening bolts, the fastening holes 311 formed to penetrate front and rear surfaces of the end plate 310, so as to be fixed to the building construction 10.

The sliding panel unit 320 is provided at a lower portion of the end plate 310 and includes a main sliding plate 330 and first and second auxiliary sliding plates 340 and 350.

The main sliding plate 330 downwardly extends a predetermined length from a center of the bottom surface of the end plate 310 in a lengthwise direction of the end plate 310, that is, in left and right directions. In addition, the main sliding plate 330 is welded to the end plate 310 to be integrally movable.

In addition, two first slots 331 penetrating front and rear surfaces of the main sliding plate 330 are formed in the main sliding plate 330 in a lengthwise direction. The first slots 331 have widths corresponding to outer diameters of tension bolts 394 of the fastening units 390, which will later be described, and extend left and right. In addition, two first hooking grooves 332, which are upwardly recessed, are formed at lower portions of the main sliding plate 330.

The first auxiliary sliding plate 340 is installed at a lower portion of the main sliding plate 330 so as to be capable of sliding left and right. Like the main sliding plate 330, two second slots 341 penetrating front and rear surfaces of the first auxiliary sliding plate 340 are formed to be spaced apart from each other, and two second hooking grooves 342 are formed at lower ends of the first auxiliary sliding plate 340. In addition, two first hooking protrusions 343 that upwardly protrude are formed so as to be inserted into the first hooking grooves 332. Since left-and-right lengths of the first hooking grooves 332 are longer than left-and-right widths of the first hooking protrusions 343, there may be a gap in which the first hooking protrusions 343 are capable of moving within the first hooking grooves 332.

The second auxiliary sliding plate 350 is installed at a lower portion of the first auxiliary sliding plate 340 so as to be capable of sliding left and right. Two third slots 351 penetrating front and rear surfaces of the second auxiliary sliding plate 350 are formed to be spaced apart from each other. Second hooking protrusions 352 inserted into the second hooking grooves 342 are provided at a top end of the second auxiliary sliding plate 350.

Since left-and-right widths of the second hooking protrusions 352 are equal to those of the first hooking protrusions 343 and left-and-right lengths of the second hooking grooves 342 are equal to those of the first hooking grooves 332, there may be a gap in which the second hooking protrusions 352 are capable of moving within the second hooking grooves 342 left and right.

Among the first to third slots 331, 341 and 351, the first slots 331 are longest and the third slots 351 are shortest in length.

Each of the prop plates 360 includes first to third prop plates 361, 362 and 363 coupled to the main sliding plate 330 and front and rear surfaces of the first and second auxiliary sliding plates 340 and 350.

The first to third prop plates 361, 362 and 363 have first to third bolting holes 364, 365 and 366 formed at locations corresponding to the first to third slots 331, 341 and 351 to penetrate front and rear surfaces of the first to third prop plates 361, 362 and 363, respectively. The first to third bolting holes 364, 365 and 366 have diameters corresponding to outer diameters of tension bolts 394 to be described later. In addition, left-and-right lengths of the prop plates 360 are longer than a left-and-right length of the sliding panel unit 320, and each two fastening protrusions 367 are formed at both left and right sides of the sliding panel unit 320.

First and second auxiliary end plates 371 and 372 are installed at both left and right sides of the prop plates 360. In addition, the first and second auxiliary end plates 371 and 372 have a plurality of auxiliary fastening holes 373 for installing fastening bolts, the auxiliary fastening holes 373 formed to penetrate front and rear surfaces of the first and second auxiliary end plates 371 and 372 so as to be fixed to the damping rods 30, respectively.

In addition, first and second insertion holes 374 and 375 are provided in the first to third prop plates 361, 362 and 363 so as to allow fastening protrusions 367 to be inserted thereto. The first insertion holes 374 are formed to be spaced apart from each other in up-and-down directions to allow the fastening protrusions 367 of the first to third prop plates 361, 362 and 363 installed in front of the sliding panel unit 320 to be inserted thereto. Second insertion holes 375 are formed to allow the fastening protrusions 367 of the first to third prop plates 361, 362 and 363 installed in rear of the sliding panel unit 320 to be inserted thereto. In particular, the second insertion holes 375 are in forms of slots extending a predetermined length back and forth, which is for the purpose of allowing the first to third prop plates 361, 362 and 363 to independently move back and forth since by fastening units 390 to be described later since the main sliding plate 330 and the first and second auxiliary sliding plates 340 and 350 are fastened with different fastening tensions.

As described above, since the first to third prop plates 361, 362 and 363 are fastened to and supported by the first and second auxiliary end plates 371 and 372, the first to third prop plates 361, 362 and 363 are not separated from each other while being capable of independently moving back and forth.

The first to third friction plates 381, 382 and 383 are installed between the main sliding plate 330 and the first prop plate 361, between the first auxiliary sliding plate 340 and the second prop plate 362 and between the second auxiliary sliding plate 350 and the third prop plate 363, respectively. In order to install tension bolts 394, fourth to sixth bolting holes 384, 385 and 386 are formed so as to correspond to the first to third bolting holes 364, 365 and 366. The fourth to sixth bolting holes 384, 385 and 386 have diameters corresponding to outer diameters of the tension bolts 394.

The fastening units 390 are provided for coupling the prop plates 360, the sliding panel unit 320 and the friction plates 380.

Each of the fastening units 390 includes a first fastening unit 391 for fastening the main sliding plate 330, the first prop plate 361 and the first friction plate 381, a second fastening unit 392 for fastening the first auxiliary sliding plate 340, the second prop plate 362 and the second friction plate 382, and a third fastening unit 393 for fastening the second auxiliary sliding plate 350, the third prop plate 363 and the third friction plate 383. Each of the first to third fastening unit 391, 392 and 393 includes tension bolts 394, nuts 395 and washer members 396.

After the tension bolts 394 sequentially penetrate the first to third bolting holes 364, 365 and 366, the fourth to sixth bolting holes 384, 385 and 386 and the first to third slots 331, 341 and 351 to then protrude, the nuts 395 are threaded to then be tightened, and washer members 396 are inserted into heads of the tension bolts 394 and insides of the nuts 395.

Since the tension bolts 394 are fastened using a torque wrench with respectively set levels of friction durability, their parts fastened by the first to third fastening units 391, 392 and 393 have different friction durability levels.

Since the main sliding plate 330 and the first and second auxiliary sliding plates 340 and 350 are fastened to the first to third friction plates 381, 382 and 383 and the first to third prop plates 361, 362 and 363 so as to have different friction durability levels in the first to third fastening units 391, 392 and 393, the high performance shear friction damper 300 according to the current embodiment of the present invention has three friction behavior sections having different friction durability levels so as to effectively cope with external loads.

As to fastening tensions of the first to third fastening units 391, 392 and 393, the first fastening unit 391 preferably has the smallest fastening tension and the third fastening unit 393 preferably has the largest fastening tension.

Figure 17:
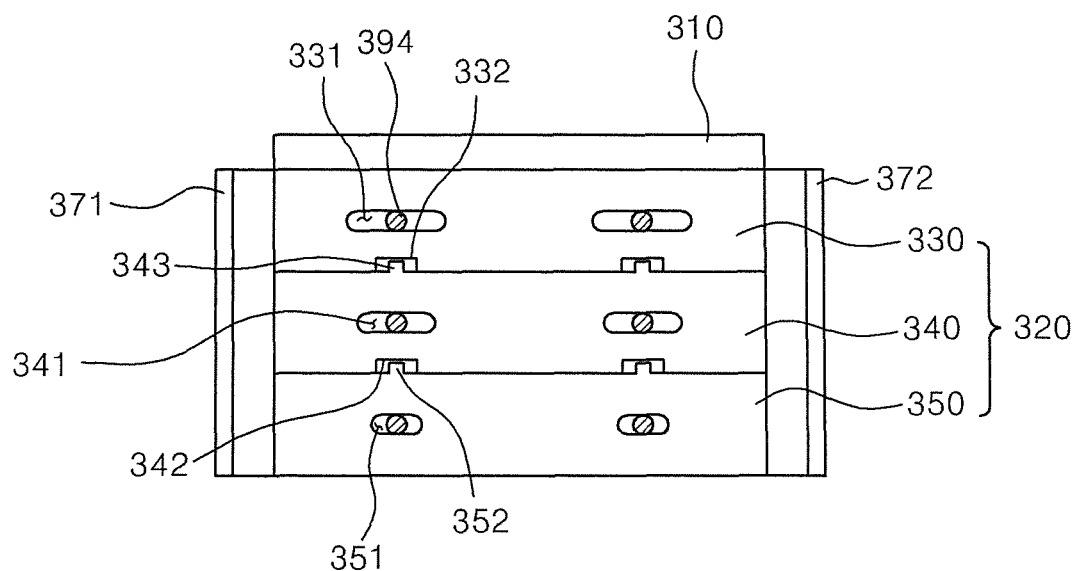
FIGS. 17 to 19 are partly exploded perspective views illustrating a driving process of the high performance shear friction damper shown in FIG. 14.

Operations of the high performance shear friction damper 300 according to the embodiment of the present invention will now be described with reference to FIGS. 17 to 19.

First, for convenient explanation of the invention, it is assumed that friction durability formed between the main sliding plate 330 and the first friction plate 381 by the first to third fastening units 391, 392 and 393 is referred to as first friction durability, friction durability formed between the first auxiliary sliding plate 340 and the second friction plate 382 is referred to as second friction durability, and friction durability formed between the second auxiliary sliding plate 350 and the third friction plate 383 is referred to as third friction durability. In a case where an external force is not applied or the applied external force is smaller than the first friction durability, as shown in FIG. 17, the main sliding plate 330 and the first and second auxiliary sliding plates 340 and 350 do not slip with respect to the friction plates 380 but remain to be initial states.

Figure 18:
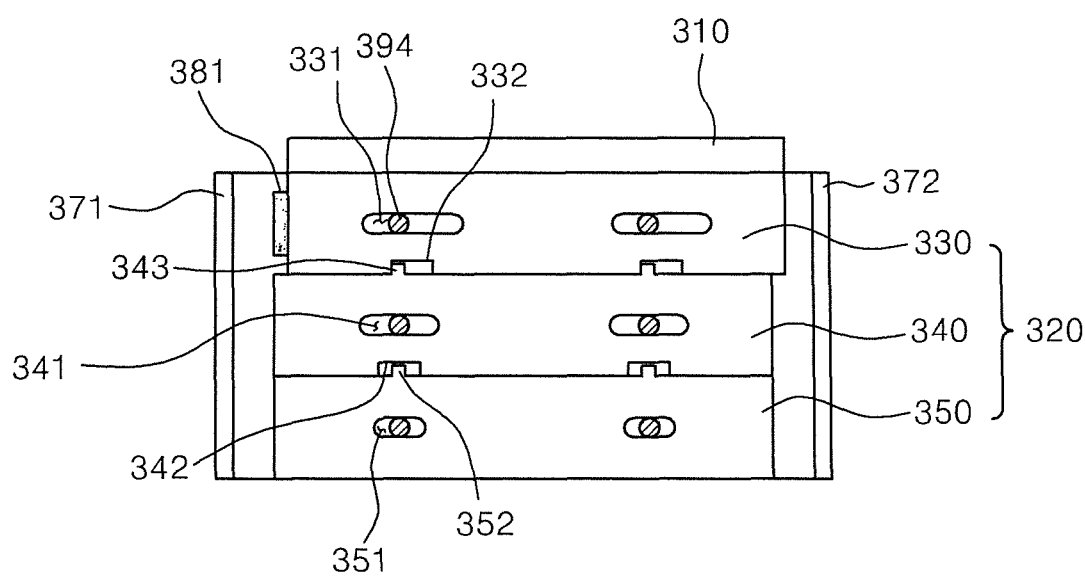

Conversely, in a case where an external force greater than the first friction durability and smaller than the second friction durability due to a small scale earthquake or external wind, as shown in FIG. 18, the main sliding plate 330 slips left and right. Here, while frictional heat is generated between the main sliding plate 330 and the first friction plate 381, the external force is consumed as the frictional heat.

A traveling distance of the main sliding plate 330 moving left and right is restricted to a location at which first hooking grooves 332 are hooked by first hooking protrusions 343. In addition, since the external force is smaller than the second friction durability, only the main sliding plate 330 moves while the first auxiliary sliding plate 340 does not move.

Figure 19:
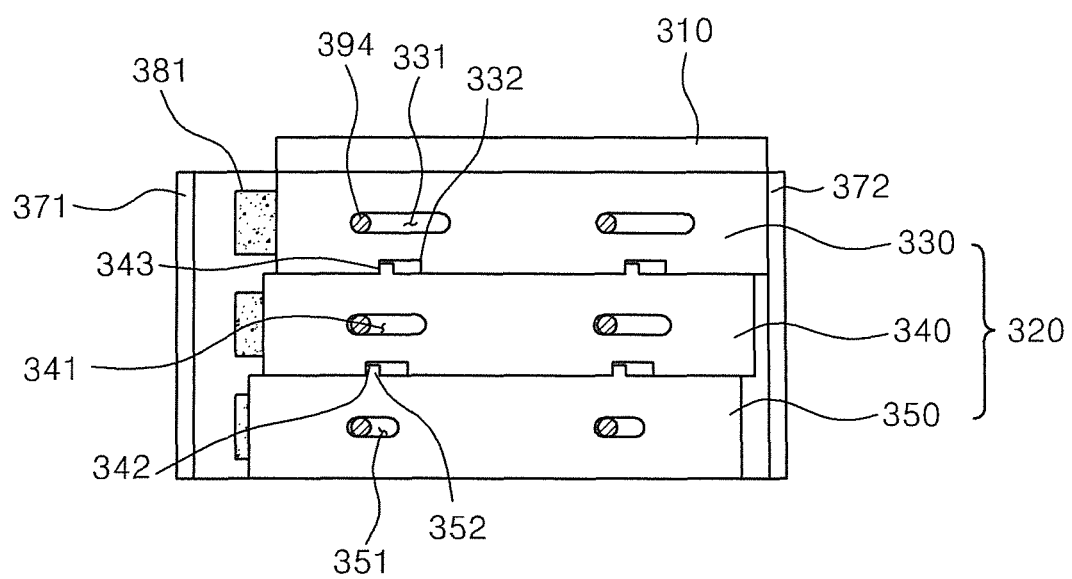

In a case where an external force greater than the second friction durability and smaller than the second friction durability due to a small scale earthquake or external wind, as shown in FIG. 19, a slip may be generated between the first auxiliary sliding plate 340 and the second friction plate 382.

Therefore, the first hooking protrusions 343 of the first auxiliary sliding plate 340 are towed in a state in which they are hooked by the first hooking grooves 332, and moves left and right together with the main sliding plate 330, increasing a left-and-right traveling distance, thereby increasing frictional heat.

The first auxiliary sliding plate 340 is capable of moving until the first hooking protrusions 343 are hooked by the second hooking grooves 342.

If the external force greater than the third friction durability, as shown in FIG. 19, the second auxiliary sliding plate 350 is towed by the second hooking protrusions 352 locked by the second hooking grooves 342, and a slip is generated between the second auxiliary sliding plate 350 and the third friction plate 383.

As described above, since the left-and-right traveling distance of the end plate 310 is adjusted by moving distances of the main sliding plate 330 and the first and second auxiliary sliding plates 340 and 350, thereby effectively attenuating a vibration with respect to external forces having various magnitudes.

As thicknesses of the washer members 396 are reduced due to abrasion of the first to third friction plates 381, 382 and 383, it is possible to prevent fastening tensions of the tension bolts 394 from being lowered, thereby preventing the high performance shear friction damper 300 from functionally degrading. Like in the first embodiment, plated spring washers are preferably used as the washer members 396.

As described above, the high performance shear friction damper 300 is driven in three stages according to the magnitude of external force applied thereto. Therefore, the high performance shear friction damper 300 can be adaptively driven to effectively cope with a small scale external force or a large scale external force.

Although not shown, driving steps of the high performance shear friction damper with respect to the externally applied vibration having various magnitudes can be further divided by increasing the number of auxiliary sliding plates.

INDUSTRIAL APPLICABILITY

The high performance shear friction damper according to the present invention can be applied to a vibration control system of a building construction, and increases availability of the vibration control system due to easy construction and maintenance and repair.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A high-performance shear friction damper comprising:
   first and second support bodies supported to a building construction or damping rods;
   two prop plates fixed to the second support body and extending to surround both side surfaces of the first support body;
   friction plates mounted between the first support body and the prop plates;
   fastening units each including a tension bolt penetrating the first support body, the friction plates and the prop plates, and a nut fastened to an end of the tension bolt,
   wherein the first support body has slots extending in a horizontal direction, the tension bolts extend while penetrating the slots to allow the first support body to be slidably movable in the horizontal direction with respect to the friction plates; and
   wherein the first support body includes a first end plate supported to the building construction or the damping rods, and a sliding plate extending from a bottom surface center of the first end plate in a direction perpendicular to the first end plate, the second support body includes a second end plate facing the first end plate and supported to the building construction or the damping rods, and extending part extending from the center of the second end plate toward an end of the sliding plate in a direction perpendicular to the second end plate, the extending part has coupling protrusions protruding in opposite sides, and the prop plates have coupling holes into which the coupling protrusions are inserted.

* * * * *